(12) United States Patent
Decker et al.

(10) Patent No.: US 11,628,322 B2
(45) Date of Patent: Apr. 18, 2023

(54) SOLENOID SUPERVISORY SYSTEM

(71) Applicant: Potter Electric Signal Company, LLC, Hazelwood, MO (US)

(72) Inventors: Timothy B. Decker, Florissant, MO (US); Michael F. Cabral, Labadie, MO (US); Andrew Louis Berry, Fairview Heights, IL (US)

(73) Assignee: Potter Electric Signal Company, LLC, Hazelwood, MO (US)

( * ) Notice: Subject to any disclaimer, the term of this patent is extended or adjusted under 35 U.S.C. 154(b) by 0 days.

(21) Appl. No.: 17/139,609

(22) Filed: Dec. 31, 2020

(65) Prior Publication Data

US 2021/0205646 A1    Jul. 8, 2021

Related U.S. Application Data

(60) Provisional application No. 62/955,573, filed on Dec. 31, 2019, provisional application No. 63/030,781, filed on May 27, 2020, provisional application No. 63/071,783, filed on Aug. 28, 2020.

(51) Int. Cl.
*F16K 37/00* (2006.01)
*A62C 35/68* (2006.01)
*F16K 31/06* (2006.01)

(52) U.S. Cl.
CPC .......... *A62C 35/68* (2013.01); *F16K 31/0675* (2013.01); *F16K 37/0041* (2013.01); *F16K 37/0083* (2013.01); *Y10T 137/5987* (2015.04); *Y10T 137/8242* (2015.04); *Y10T 137/8359* (2015.04)

(58) Field of Classification Search
CPC ............. F16K 31/0675; F16K 37/0041; F16K 37/0083; H01F 7/127; H01F 7/1844; A62C 35/68; A62C 37/50; Y10T 137/5987; Y10T 137/8242; Y10T 137/8359
See application file for complete search history.

(56) References Cited

U.S. PATENT DOCUMENTS

| | | | | |
|---|---|---|---|---|
| 3,095,902 A | * | 7/1963 | Caton ................. | F16K 31/0679 251/363 |
| 3,688,495 A | * | 9/1972 | Fehler ....................... | F02C 9/32 60/741 |
| 4,406,303 A | * | 9/1983 | Kilmoyer ............. | H03K 17/945 137/554 |
| 4,518,008 A | * | 5/1985 | Fenster .................. | A62C 37/50 137/554 |
| 5,477,149 A | * | 12/1995 | Spencer ............. | F16K 37/0083 702/56 |

(Continued)

FOREIGN PATENT DOCUMENTS

WO    2019/211820 A1    7/2019

OTHER PUBLICATIONS

International Preliminary Report on Patentability issued for PCT/US2020/067704 dated Jul. 5, 2022, 6 pages.

*Primary Examiner* — Matthew W Jellett
(74) *Attorney, Agent, or Firm* — Lewis Rice LLC

(57) ABSTRACT

Systems and methods for a solenoid supervisory detection system which can detect the presence or absence of a solenoid plunger within a solenoid coil. These systems can be used to verify correct reassembly of a solenoid valve after it has been disassembled for testing.

8 Claims, 5 Drawing Sheets

(56) References Cited

U.S. PATENT DOCUMENTS

| | | | | |
|---|---|---|---|---|
| 5,584,319 | A * | 12/1996 | Cholin | F16K 37/0058 137/554 |
| 5,606,992 | A * | 3/1997 | Erickson | F16K 31/0675 251/129.21 |
| 6,189,565 | B1 * | 2/2001 | Skog | F16K 37/0058 137/554 |
| 7,420,450 | B2 * | 9/2008 | Medrano | A62C 37/50 335/282 |
| 8,277,731 | B2 * | 10/2012 | Yorita | G01N 5/02 422/68.1 |
| 8,382,062 | B2 * | 2/2013 | Christensen | H01F 7/1607 335/278 |
| 10,155,126 | B2 * | 12/2018 | Schwobe | F16K 31/0675 |
| 2004/0036273 | A1 * | 2/2004 | McClary | H01R 13/641 285/18 |
| 2006/0244783 | A1 | 11/2006 | Horsnell et al. | |
| 2007/0247265 | A1 * | 10/2007 | Medrano | A62C 37/00 335/282 |
| 2016/0125993 | A1 | 5/2016 | Narayanasamy et al. | |
| 2017/0030739 | A1 | 2/2017 | Li et al. | |
| 2017/0167630 | A1 | 6/2017 | Ferrer Herrera et al. | |

* cited by examiner

SOLENOID SUPERVISORY SYSTEM

CROSS REFERENCE TO RELATED APPLICATIONS

This application claims benefit of U.S. Provisional Patent Application No. 63/071,783 filed Aug. 28, 2020, U.S. Provisional Patent Application No. 63/030,781, filed May 27, 2020, and U.S. Provisional Patent Application No. 62/955,573 filed Dec. 31, 2019. The entire disclosure of all the above documents is herein incorporated by reference.

BACKGROUND OF THE INVENTION

Field of the Invention

This disclosure relates to the field of evaluation systems for electrical solenoids, particularly to systems for determining if an electrical solenoid valve has been reassembled after testing.

Description of the Related Art

To tight fires in modern buildings, firefighters use a wide variety of tools but are also regularly aided by systems within the building. Modern buildings almost universally include fire suppression systems to control or extinguish fires. The suppression agent may be a gas or a liquid. Fire suppression systems generally follow a fairly standardized principle. A firefighting material is maintained in a series of pipes or vessels, generally under pressure, which are arranged throughout all areas of the building. In a wet pipe system, water is actually stored within the pipes, whereas in a dry pipe system, water is stored external to the building while the pipes contain pressurized air, nitrogen, or other gas. In a gas suppression system, the suppression agent is contained in pressurized tanks or vessels on the premises. Attached to these pipes are various sprinklers or nozzles which, when activated, will spray the suppression agent into a predetermined area.

In a typical fire sprinkler system, when a fire situation is detected, sprinklers on the pipe structure are activated by heat which then spray the agent. This activation is generally performed by a heat sensitive element, an integral part of the sprinkler which is activated by the heat from the fire. Generally, each sprinkler has its own heat sensitive element and is activated independent of all other sprinklers. When a particular sprinkler is activated, the suppression agent in the pipes or vessel is dispensed by the sprinkler to a predetermined location. This action dispenses the suppression agent on the fire and serves to control or extinguish the fire. These systems may be initiated by the activation of smoke, flame, or heat detectors in the protected area. Originally, the sprinkler included a breakable element that broke when exposed to sufficient heat. Breaking of that element served to create a pressure outlet at the sprinkler head which had been activated by effectively opening the sprinkler head. This served to direct the pressurized water in the pipes toward the open sprinkler.

In dry and pre-action pipe systems, the pipes in the sprinkler system are not filled with water but are filled with pressurized gas. The pressure of the gas in the sprinkler system typically serves to hold down a clapper valve on the dry pipe which in turn holds back the water which may be in a pressurized municipal system or some form of pressurized tank. When a sprinkler head activates, the gas is initially released from the sprinkler head in the same way water was in the system described previously. This causes the gas pressure to drop in the dry pipe system. Once the pressure drops below a threshold, the clapper valve opens and pressurized water enters the pipe. The water will flow toward the sprinkler head continuing to push out gas and supplant it with water until the water itself reaches the sprinkler head and begins to be sprayed on the fire.

Because sprinkler systems provide water via the sprinkler system to the area of the open sprinkler head, it should be apparent that a false alarm can have damaging results. If the sprinkler head becomes open inaccurately (e.g. because the heat sensitive element is broken through impact instead of heat, for example), the system will dutifully supply water to, and spray water from, that sprinkler head. It will also typically do so until the water source is shut off. The sprayed water can therefore do substantial damage to property should a fire not be present at the sprinkler head.

To deal with this concern, pre-action fire sprinkler systems were developed. These utilize the basic concept of a dry pipe system in that water is not normally contained within the pipes but the pipes are also often not maintained at substantial pressure. Thus, opening of a sprinkler head is typically insufficient to release water. Instead, water is held from the sprinkler piping by an electrically operated valve which is commonly known as a deluge valve. Operation of the deluge valve is controlled by independent flame, heat, or smoke detectors which are independent of the sprinkler heads.

In a pre-action fire sprinkler system, two separate events must occur to initiate sprinkler discharge. First, the detection system must identify a possible fire (e.g. through smoke detection) and then open the deluge valve to allow water to flow into the sprinkler piping. At this stage, the system has effectively become a wet pipe sprinkler system. Once an individual sprinkler head releases after this time, water can flow from the system, through the open sprinkler head, and onto the fire. As should be apparent, the two steps can occur in opposite order and in close proximity if not simultaneously to each other. The key, however, is that both events have to occur for the sprinkler to activate and discharge water which can dramatically reduce the damage from a false alarm situation.

In order to provide control for fire sprinkler systems, there is usually some form of a control panel which serves as a central station for operation of the various components. In pre-action systems, control of the deluge valve may be included as part of the main control system, or it may be controlled by a separate releasing panel. The latter arrangement is typically preferred as it provides that the two systems are separately controlled. While it is typically allowed to install both controls into a single panel, it should be apparent that a single false alarm to that panel could result in sprinkler activation. However, if there are two separate panels, each can act as a check on the other.

The deluge valve is typically in the form of a solenoid valve and electrification of the solenoid is engaged by the releasing panel to release the fire suppression agents to the sprinkler heads and nozzles should a potential fire be detected. This is a particularly common arrangement in pre-action (dry pipe) systems. In these systems, when the fire or sprinkler releasing panel detects a fire via heat, smoke, or other detectors, the panel typically operates the solenoid to cause the deluge valve to flood the sprinkler piping system with suppression agent to be ready to extinguish the fire. Agent suppression or other systems may also use similar solenoids to keep the suppression agent contained in the pressurized vessel or at other points in the suppression system.

While solenoid valves can prove very useful and reliable as deluge valves, they do create a major concern. In particular, a solenoid valve must be correctly assembled and in electrical operation in order to open. As a solenoid valve is dependent on a electromagnetic force to move the solenoid plunger to open the valve, if there are any problems with the electromagnetic coil, or associated electronics, the valve will not open. Similarly, if the plunger is not placed within the coil, even an effective engagement of the coil will not serve to open the valve.

Because the system is highly reliant on operation of the deluge valve, it is necessary to test the systems of the releasing panel on a regular basis. This includes verifying that the solenoid coil will correctly generate an electromagnetic field to activate the plunger. However, as the plunger is holding back water from entering the pipes in the sprinkler system it is clearly undesirable to actually activate the plunger in a test. Instead, traditional test methods involve removing the plunger from the coil and activating the coil while the components are separated. This allows for the coil to be tested for correct activation without actually opening the deluge valve. However, as this testing involves disassembly of the solenoid valve, there is a concern that the valve may be incorrectly reassembled after testing which can result in a dangerous situation where the valve cannot be opened by the releasing panel.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, there is described herein, among other things, a solenoid supervisory system which can detect the presence or absence of a solenoid plunger within a solenoid coil. These systems can be used to verify correct reassembly of a solenoid valve after it has been disassembled for testing.

There is described herein, among other things, a system for detecting the presence of a solenoid plunger within a solenoid coil, the system comprising: a solenoid coil assembly comprising a solenoid winding within an electrically conductive coil case; a power source electrically connected to the electrically conductive coil case; and a solenoid plunger assembly comprising a solenoid plunger within an electrically conductive plunger case; wherein, when the solenoid plunger assembly is correctly positioned within the solenoid coil assembly, the electrically conductive coil case is in electrical communication with the electrically conductive plunger case.

In an embodiment, the system further comprises a microcontroller for detecting current flow from the power source, through the coil case, and into the solenoid case.

In an embodiment, the system further comprises an insulator shell arranged between the solenoid winding and the electrically conductive coil case.

In an embodiment, the system further comprises an over mold surrounding the electrically conductive coil case.

In an embodiment of the system, the coil case comprises metal.

In an embodiment of the system, the solenoid case comprises metal.

In an embodiment of the system, the solenoid plunger assembly further includes a valve which is opened by movement of the solenoid plunger.

In an embodiment of the system, the valve is a deluge valve in a fire sprinkler system.

There is also described herein, in an embodiment, a system for detecting the presence of a solenoid plunger within a solenoid coil, the system comprising: a solenoid coil assembly comprising a solenoid winding; a solenoid plunger assembly comprising a solenoid plunger; an electric circuit connected to the solenoid winding, the circuit comprising: an isolated power supply; a Colpitts oscillator; a low pass filter, rectifying and attenuating output of the oscillator; a non-inverting amplifier, amplifying output of the low pass filter; a comparator for comparing output of the amplifier against a set voltage; and a monostable multivibrator acting on output of the comparator to drive a FET opto-coupler.

In an embodiment of the system, the low pass filter, the non-inverting amplifier, and the comparator, are part of a microcontroller.

In an embodiment of the system, the microcontroller supplies two different types of signals to the solenoid winding.

In an embodiment of the system, the microcontroller detects resultant waveforms from both the signals.

In an embodiment of the system, the first of the signals is used to detect the solenoid winding's inductance.

In an embodiment of the system, the first of the signals is a single, positive going, fixed voltage, fixed time pulse.

In an embodiment of the system, the second of the signals is used to detect the solenoid winding's capacitance.

In an embodiment of the system, the second of the signals includes coded and/or modulated signal packets.

There is also described herein, in an embodiment, a method for detecting the reassembly of a deluge valve in a fire sprinkler system, the method comprising: providing a deluge valve including a solenoid formed of a solenoid plunger removable from within a solenoid coil; connecting a circuit to the solenoid coil; measuring from the circuit, at least one of the inductance or the capacitance of the solenoid coil; and determining from the measuring, if the solenoid plunger is within the solenoid coil.

BRIEF DESCRIPTION OF THE DRAWINGS

FIG. 1A depicts a perspective view, FIG. 1B depicts a side view, and FIG. 1C depicts an exploded view.

DETAILED DESCRIPTION OF PREFERRED EMBODIMENTS

Figure 1C:
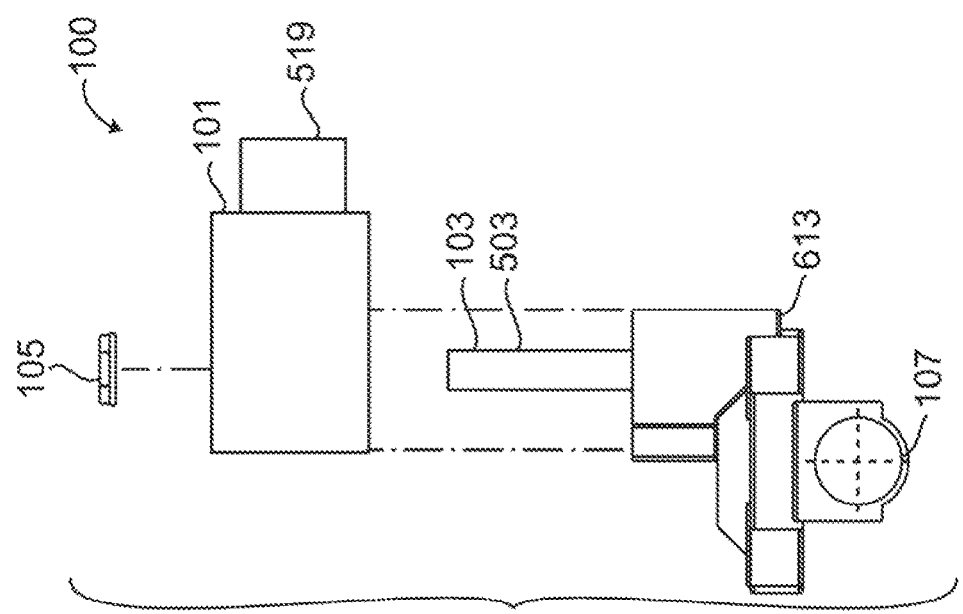
FIGS. 1A, 1B and 1C depict a solenoid valve as may be used in a fire sprinkler system.
Figure 1B:
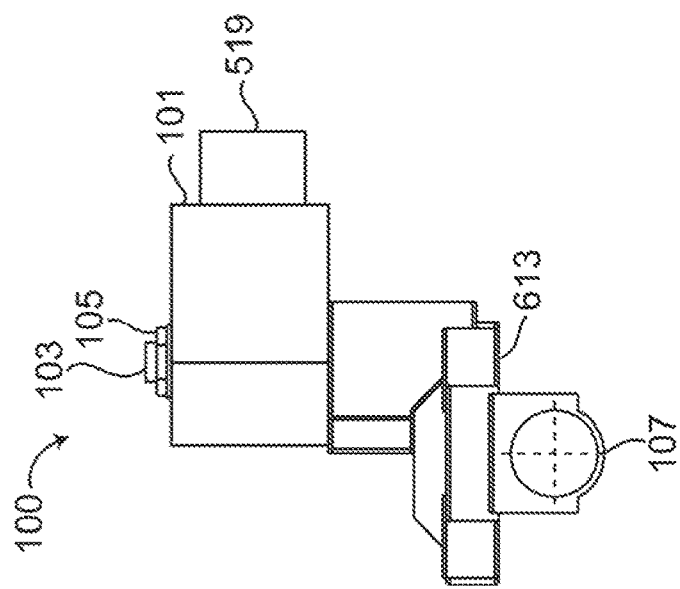
Figure 1A:
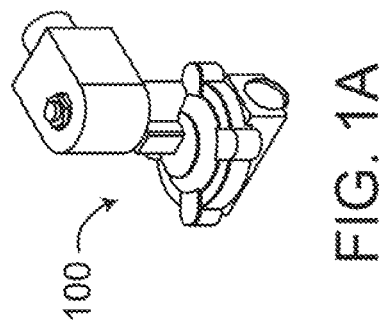
Figure 5:
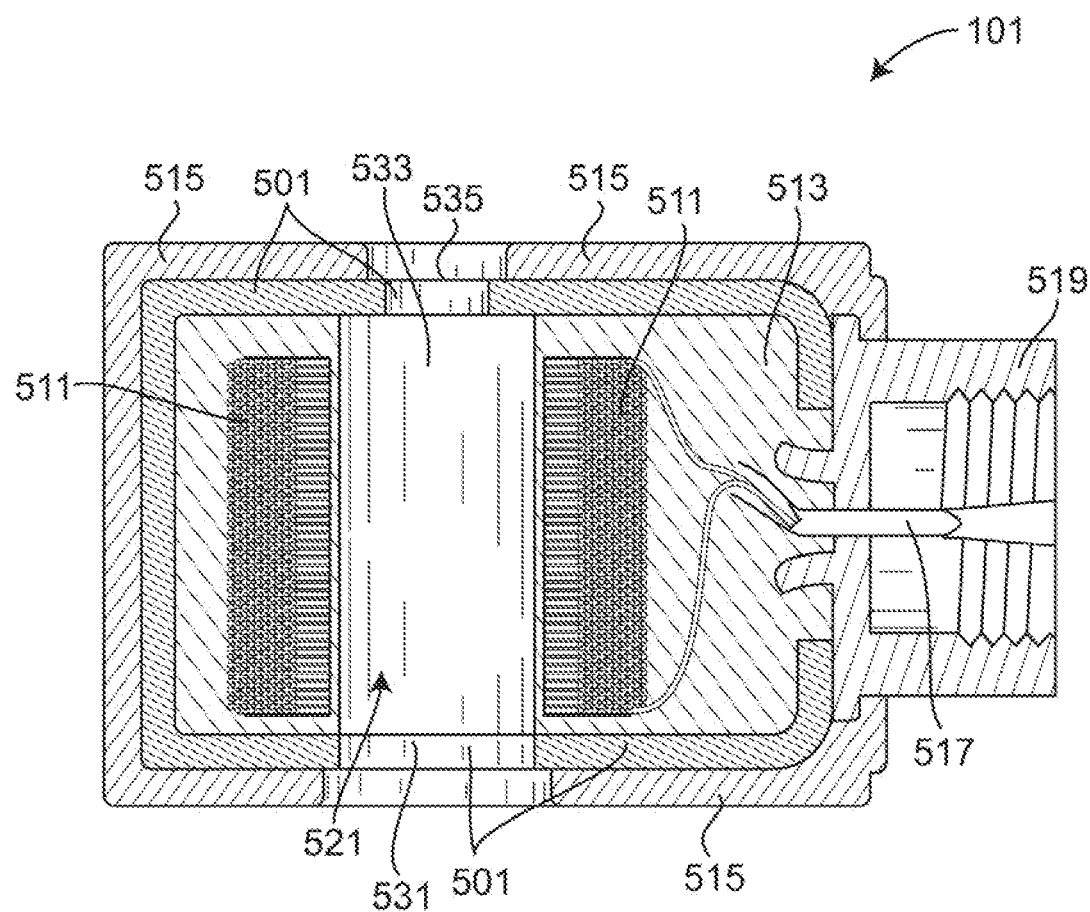
FIG. 5 provides a drawing of a cut through of a solenoid case.

Solenoid valves (100) such as those for use in fire suppression sprinkler systems typically come in three major pieces as shown in FIGS. 1A, 1B, and 1C as well as FIG. 5. As shown in these FIGS, there is typically a solenoid coil component (101) which surrounds a solenoid plunger component (103). The solenoid plunger component (103) will include the moving solenoid plunger which is connected to the physical valve (107) for controlling flow through an attached pipe. The solenoid plunger component (103) and solenoid coil component (101) are typically held together by a single nut (105) which is located at the end of the solenoid plunger component (103).

As can be best seen in FIG. 5, The solenoid coil component (101) follows a fairly typical construction. Specifically, the solenoid coil component (101) comprises a coil winding (511) which, when electrified, acts as the electromagnet to produce a magnetic field inside void (521). The coil winding (511) is encased within a shell (513) which is formed of an electrical insulator to provide for structure to the coil winding (511) as well as electrical isolation for the coil winding (511), In FIG. 5, the insulator shell (513) comprises a formed plastic and specifically an epoxy filing which encloses the coil winding (511). The coil winding (511) is positioned around, and separated from, the void (521) into which the solenoid plunger (103) shaft (503) is placed via the insulator shell (513).

The insulator shell (513) is typically enclosed inside a coil case (501). The case (501) is typically metal so as to provide strength to the solenoid coil (101) but also to act as a magnetic focuser for the resultant magnetic field produced by the coil winding (511). As can be seen in FIG. 5, the void (521) will typically cut through the shell (513) and the case (501). However, the shell (513) is typically not located between the case (501) and void (521) where the void (521) passes through the case (501) at points (531) and (533). This creates two rings of metal, one at each of points (531) and (533), in the wall of the void (521). There is also an opening at the end (535) to allow placement of the nut (105) to hold the components together.

The case (501) will typically additionally be surrounded by an over mold (515) which serves to encase the case (501). The over mold (515) will also typically be electrically insulated and the depiction of FIG. 5 comprises a plastic and specifically a polycarbonate over mold (515) structure. The over mold (515) can be used to improve the look of the device and for protection of the case (501) but it also serves to electrically isolate the coil case (501) from any nearby objects.

The solenoid plunger component (103) will typically include two functional elements although they are typically integrally formed. There is a shaft (503) and a valve housing (613). The shaft (503) includes the physical solenoid plunger which moves within the shaft (503) to activate the valve (107) which is physically internal to the valve housing (613). The valve housing (613) is typically in the form of a metal case as is the shaft (503). However, the shaft (503) and valve housing (613) may be, and typically are, or different metals. The shaft (503) is metal so that it can conduct the electromagnetic fields induced by the coil winding (511) to open and close the solenoid plunger. Thus, when the solenoid coil (101) is placed over the shaft (503) of the solenoid plunger (103), the shaft (503) extends into, and generally through, the void (521). In this position, the shaft (503) will typically contact at least a portion of the case (501) at point (531) and/or point (533) or be very close thereto. Specially, the shaft (503) will tend to be in electrical connection with the case (501) at point (531) and/or point (533). In typical prior operation, electrical power for operation of the solenoid is provided via the leads (517) through the conduit (519) to the coil winding (511) and there is no electrification of case (501). However, it is not uncommon for their to be wiring connecting to case (501) which can act as a ground for signals to coil winding (511).

In order to test the solenoid valve, it is common practice in the industry for the solenoid coil component (101) to be removed from the solenoid plunger component (103) (or vice-versa). Specifically, the party testing the solenoid (100) will disassemble the parts as shown in FIG. 1C in order to keep the deluge or pre-action valve in the fire suppression system from tripping or from releasing the agent from the pressurized vessel into the pipes while the components which are designed to operate the system are being tested. By removing the plunger (103), the coil winding (511) can be safely energized as part of the testing to make sure that the coil winding (511) and associated electronics are functional. However, as the plunger component (103) is separate, the lack of electrification on the plunger component (103) keeps the plunger from moving and, thus, the valve (107) closed.

Once the solenoid coil component (101) and solenoid plunger component (103) are separated, the coil winding (511) can be activated without tripping the system and opening the valve (107). In order to verify that the coil winding (511) is correctly energized, a metal screw driver or other metal object is typically inserted into or around the solenoid coil (101). This can enable a technician to verify that the coil winding (511) has developed a magnetic field.

Once the solenoid coil (101) operation has been verified, the solenoid coil (101) should be returned to the solenoid plunger (103) and the nut (105) reattached so the device is reassembled into the configuration of FIG. 1B. The problem is that there is nothing in the releasing panel (300) to detect if the solenoid coil (101) has been put back correctly after the test is complete. If the solenoid valve (100) remains disassembled as in FIG. 1C, the valve (100) would still read as normal to the fire and sprinkler releasing panels as the coil component (101) is still correctly electrically connected. However, if the solenoid valve (100) is not assembled, activation of the coil winding (511) will not move the solenoid plunger (103) and the valve (107) will not open when the coil (511) is electrified. This will prevent the fire suppression system from operating without manual intervention. Further, in some situations the metal test object (e.g. screwdriver) that was used to test for electrification of the coil (511) may be left in the coil component (101) which can create further concerns.

Figure 2:
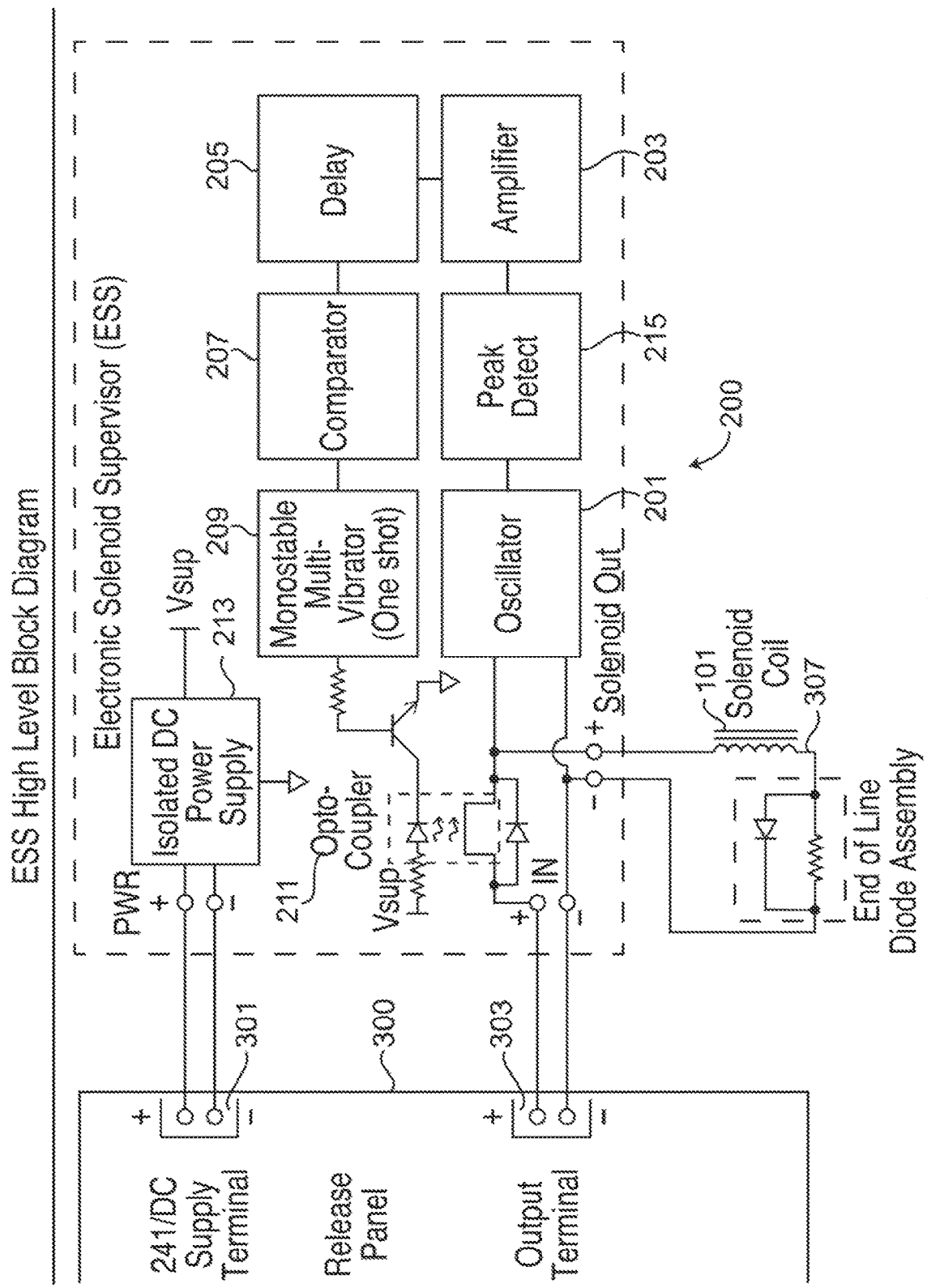
FIG. 2 provides a block diagram of a first embodiment of a solenoid supervisory system.

In order to detect if the coil component (101) and plunger component (103) have been reassembled or remain unassembled, there are provided herein a number of embodiments of systems to detect the correct reassembly of the solenoid valve (100). A first embodiment of such a system (200) is shown in FIG. 2 and comprises an electrical circuit which uses inductance to determine if the shaft (503) is present in the void (521). In the embodiment of FIG. 2, the circuit comprises an oscillator (201), low pass filter amplifier (203), a delay (205), a comparator (207), a mono-stable multi-vibrator (One Shot) (209), a FET opto-coupler (211), and an isolated power supply (213) along with other associated electronics as shown. With the exception of the oscillator (201) and FET opto-coupler (211), in an alternative embodiment of a similar system (200), the remainder of the circuit of FIG. 2 can be replaced by a microcontroller.

Connections to the system (200) of FIG. 2 involve connections for positive (+) and negative (−) power supply (301), two connections for the releasing panel output and return (303), and two connections for the solenoid coil (101) and end of line diode assembly (307). While shown external to a fire-sprinkler releasing panel (300) in FIG. 2, in an alternative embodiment, the circuitry can be integrated into the fire/sprinkler releasing panel (300) and/or into another control panel in the fire suppression system.

The system of FIG. 2 will generally operate as follows. The oscillator (201) is preferably of the type known by those of ordinary skill in the art as a Colpitts oscillator. The oscillator (201) output frequency changes proportionately as the inductance of the solenoid coil (101) is changed. The output of the oscillator (201) is fed into a low pass filter (215) that rectifies and attenuates the signal to a DC voltage level that varies as the frequency changes. Then, the signal is fed into a non-inverting amplifier (203). The output of the amplifier (203) goes to a delay (205) and then to a comparator (207) where it is compared to a tunable voltage that is set to a voltage between the voltage measured when the solenoid coil component (101) is separated from the solenoid plunger component (103) and when it is attached. The comparator (207) output changes states from rail to rail differentiating between when the solenoid plunger component (103) and solenoid coil component (101) am assembled vs. disassembled.

The comparator (207) output feeds a monostable multivibrator (209) commonly known to those of ordinary skill in the art as a "one shot" circuit (209) that provides a high output when its input is high and a varying duty cycle output when its input is low. The varying duty cycle output comprises a low signal for a period of time (e.g. 10 mS) and then a high signal for a second shorter period of time (e.g. 500 µs). At the end of this second period, the signal returns to the low signal again and so on and so forth. The output of the one shot (209) drives the optically isolated FET optocoupler (211). When the FET (211) is off, the releasing panel (300) will signal a trouble condition (as this indicates that the solenoid coil component (101) and solenoid plunger component (103) are not connected). Alternatively, when the coil component (101) and plunger component (103) are connected, the FET (211) will be on and the standard operating state will be indicated by the releasing panel (300).

The releasing panel (300) is generally already required by governing agencies to electronically supervise all valves controlling the water supply for automatic sprinkler systems so the above new functionality is not outside its capabilities. Therefore, as releasing panels (300) are generally already capable of supervising opens, shorts, and wiring polarity, the above modifications are easily made to allow the panel (300) to supervise that the solenoid coil (101) is attached to the solenoid plunger (103).

When the FET (211) is off, the output signal of the oscillator (201) is effectively shut down causing the input signal to the One Shot (209) to remain low. While in this state, the One Shot (209) provides an output signal that periodically goes high to turn on the FET (211) so that the oscillator (201) can start up and essentially retest that the solenoid coil (101) is still installed on the solenoid plunger (103). If not, the FET (211) turns back off and the process repeats itself. If the solenoid coil (101) is installed on the solenoid plunger (103) then the One Shot's (209) output goes high turning the FE T (211) on thereby clearing the trouble condition from the panel.

The wiring of system (200) and the associated solenoid valve (100) may also include standard wiring supervisory systems, as is understood by those of ordinary skill in the art, to monitor the system for grounds, opens, and shorts.

Figure 3:
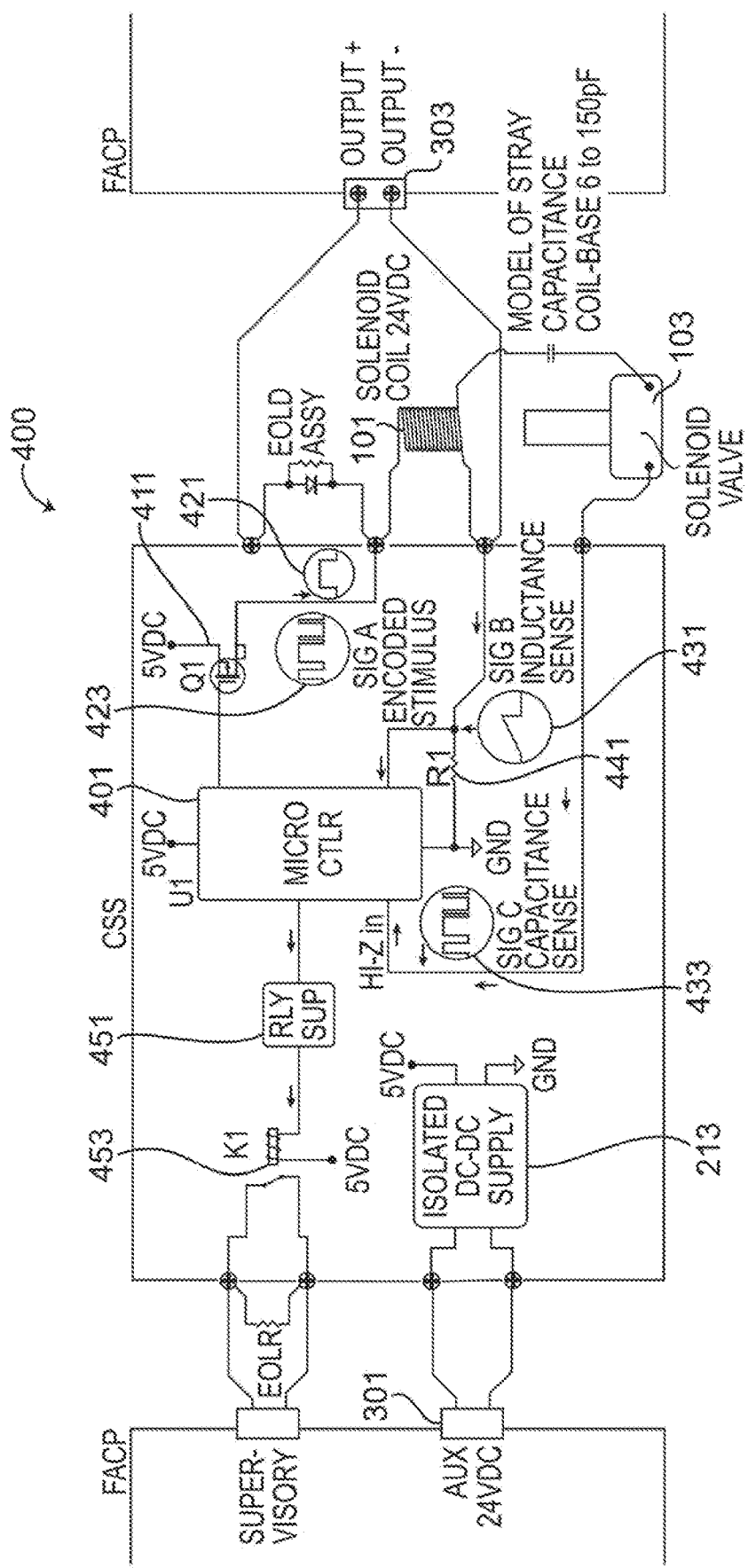
FIG. 3 provides a circuit diagram of a second embodiment of a solenoid supervisory system.

FIG. 3 provides for another embodiment of a solenoid supervisory system (400). In this embodiment a microcontroller (401) has been provided to replace much of the circuitry of the inductance detection as contemplated in the alternative embodiment of FIG. 2. The microcontroller also allows for additional detection as contemplated below. As in system (200) the system (400) is designed to determine if the solenoid plunger (103) is within or external the solenoid coil (101). In FIG. 3, however, the system (400) utilizes both an inductance and a capacitance calculation to further assist in solenoid detection.

In operation, the system circuit (400) will be powered by the isolated power supply (213) in the same manner as in system (200). The microcontroller (401) will apply two different forms of stimulus signal (421) and (423) to the solenoid coil (101), via the field effect transistor (FET) (411). The microcontroller (401) then detects the resultant waveforms (431) and (433) from both these stimulus signals (421) and (423) having interacted with solenoid components.

The first stimulus signal (421) is also used to detect the coils inductance as in the operation of the embodiment of FIG. 2. However, the mechanism for detecting the inductance is different. The stimulus signal (421) for this detection has the form of a single, positive going, fixed voltage, fixed time pulse. This signal will travel to the solenoid coil (101) as shown. This signal (421) will result in a ramping voltage across current sense resistor R1 (441) producing signal (431). Due to the fixed pulse width of signal (421), the peak of the ramp of signal (431) will be proportional to inductance of the solenoid coil (101).

The microcontroller (401) will detect the peak of signal (431) and determine the status of the solenoid plunger (103) relative to the solenoid coil (101). A peak in signal (431) which is too high indicates that the solenoid plunger (103) is separated from the solenoid coil (101) and needs to be returned. However, it should be recognized that if there is placement of a metal object (e.g. a screwdriver) other than the solenoid plunger (103) in the solenoid coil (101), this could result in the peak of signal (421) being insufficient to trigger a missing coil indication on its own. That is where the second stimulus signal (423) comes in.

The second stimulus signal (423) is used to detect stray solenoid coil (101) capacitance. The second stimulus signal (433), in the depicted embodiment, takes the form of coded and/or modulated signal packets applied as shown. The baud rate is sufficiently high to pass through the stray capacitance of a mounted coil and be detected by a Hi-Z input on the microcontroller (401). When the solenoid coil (101) capacitance is sufficiently large, the received signal (433) will be distinct and its encoded data will be resolvable by the microcontroller. This will indicate that the solenoid plunger (103) is in place. When the solenoid coil (101) capacitance declines significantly, the received signal (433) will be compromised and its data unrecoverable or corrupt indicating that the solenoid plunger (103) has been removed. Thus, when the microcontroller (401) can receive and decode the same data that it transmitted (e.g. signal (423) and signal (433) include the same data), it concludes the solenoid plunger (103) is in place. This methodology can distinguish between data signal and random noise signal and can generally further detect if an object other than the solenoid plunger (103) is in place in the coil.

When both stimulus signals (421) and (423) continue to produce qualifying responses (431) and (433), the microcontroller (401) will continuously provide a repeating "heartbeat-type" signal to the relay supervisory circuit (451). The relay supervisory circuit (451) will, in turn, keep the supervisory relay (453) energized indicating that the solenoid plunger (103) is in place in the solenoid coil (101) and that the normal and desired operation is proceeding. Any de-energizing of the relay (453) will signal a supervisory condition to the control panel (300) and this may trigger an alarm condition or otherwise provide an indication of concern.

Figure 4:
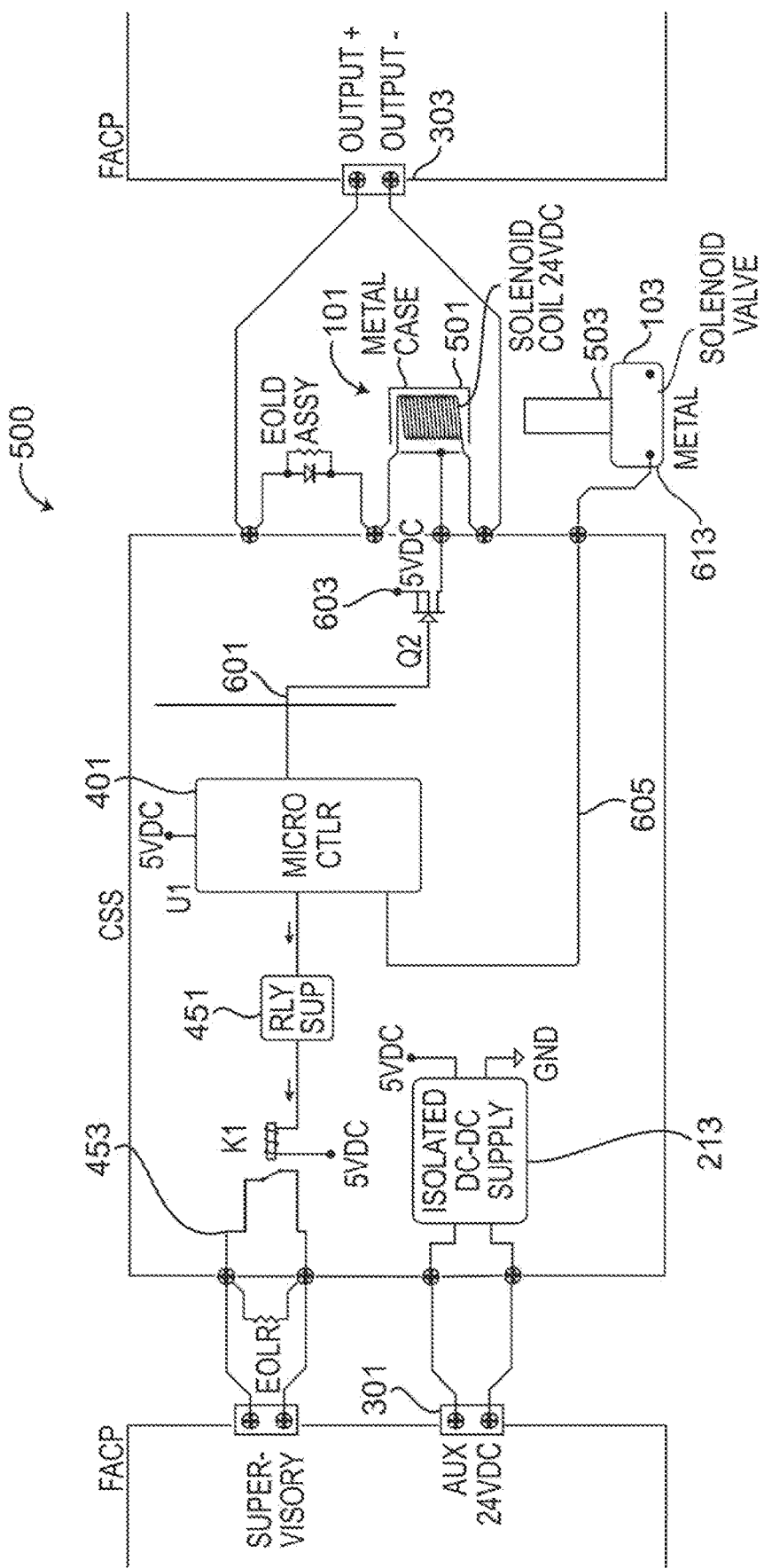
FIG. 4 provides a circuit diagram of a third embodiment of a solenoid supervisory system.

FIG. 4 provides for a still further embodiment of a solenoid supervisory system (500). As in the embodiment (400) of FIG. 3, a microcontroller (401) has been provided to replace much of the circuitry as contemplated in the alternative of FIG. 2. The microcontroller (401) also allows for additional detection as contemplated below. As in systems (200) and (400) the system (500) is designed to determine if the shaft (503) is within or external the void (521). In FIG. 4, however, the system utilizes material characteristics of the solenoid coil component (101) and solenoid plunger component (103) to detect the continuity of an electrical circuit formed when the solenoid coil component (101) and solenoid plunger component (103) are together.

As was discussed above, the case (501) is typically in electrical communication with the shaft (503) only when the shaft (503) is in the void (521). Specifically, when correctly positioned, the shaft (503) will typically contact at least a portion of the case (501) at point (531) and/or point (533) or will be very close thereto to allow electrical communication between the metal components. This has typically been to provide a common ground. Specially, the shaft (503) will tend to be in electrical connection with the case (501) at point (531) and/or point (533). This electrical connection can allow for the system (500) to detect that the solenoid plunger (103) and the solenoid coil (101) have been reconnected as shown in FIG. 1B.

An embodiment of a system (500) for performing such detection is shown in FIG. 4. In FIG. 4 the microcontroller (401) has an electrical connection (601) to the case (501). This electrical connection may be direct or may be via another component of the solenoid coil (101) which is in electrical communication with the case (501). In an embodiment, the connection is actually via the existing ground wire connected to the case (501). Alternatively, a bracket may be added to connect to the conduit (519) which is often formed into screw threads for connection to other components of the sprinkler system and is typically in electrical communication with the case (501) possibly by being jointly formed. While the above methods work well for retrofitting existing solenoid valves (100), it is also possible to purposefully build electrical connections into the coil component (101) for purposes of providing signals to the case (501).

The electrical connection (601) is attached to a power source (603). The power source (603) will typically be a small DC power source (e.g. under 10 volts) and in the depicted embodiment comprises a 5 volt DC source. However, alternative power sources may be used in alternative embodiments including converting power provided for operation of the solenoid valve (100) for this purpose. The power source (603) is typically not designed to provide any direct power, but simply to act as a source of voltage and/or current which can be detected by the microcontroller (401). As such it will be electrically isolated from the power source which is to supply power to the coil winding (511)

The microcontroller (401) also has an electrical connection (605) to the solenoid plunger component (103). In the depicted embodiment, the connection is to the valve housing (613) of the solenoid plunger component (103), however it may be to any component of the solenoid plunger component (103) which is in electrical communication with the metal shaft (503) or which would otherwise be in electrical communication with the case (501) when the solenoid plunger component (103) is correctly positioned with the solenoid coil component (101) as shown in FIG. 1B. That is, when the shaft (503) is in the void (521), the electrical connection between the shaft (503) and the points (531) and/or (533) serves to complete the electrical connection of (601) and (605). When the shaft (503) is not in the void (521), this connection is broken. In a still further alternative embodiment, the connection (605) may be with the nut (105) instead of to a component of the solenoid plunger (103), but this is generally not preferred as it can make the nut (105) difficult to work with, but it would serve to provide for the appropriate electrical connection. Further, when retrofitting on an existing solenoid valve (100), the electrical connection (605) may be made through a bracket attached to the valve housing (613) as the valve housing (613) typically lacks an insulating over mold.

As can be seen in FIG. 4, the power source (603) is typically always energized (such as by it being a chemical battery, for example). Thus, when the solenoid plunger (103) is in position on the solenoid coil (101) as in FIG. 1B, the electrical path (601) to (605) is completed and the microcontroller (401) will detect the voltage produced by the power source (603) on connection (605). When the solenoid coil (101) and solenoid plunger (103) are separated as in FIG. 1C, the electrical connection is broken and microcontroller (401) will not detect the voltage indicating that the structure is still disassembled.

It should be apparent that the presence of an alternative conductor (for example, a screwdriver) placed in the void (521) can illustrate energizing of the coil winding (511), but will not result in the electrical path between (601) and (605) being completed because it lacks the connection (605) of the plunger component (103). Therefore, the system (500) will be able to detect if the specific solenoid coil component (101) and solenoid plunger component (103) are assembled or disassembled, even if there is an alternative conductor in the void (521).

In an alternative embodiment for still further assurance of connection, microcontroller (401) may provide that the power source (603) signal includes some form of encoding. Thus, when the signal is received back at microcontroller (401) from connection (605) the encoding would also need to be detected by the microcontroller (401) to confirm connection. In a still further embodiment, the specific resistance or other electrical characteristic of the plunger component (103) could be known and the microcontroller (401) could utilize that known value to verify that the signal from connection (605) is as expected.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "spherical" are purely geometric constructs and no real-world component or relationship is truly "spherical" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A system for detecting the presence of a solenoid plunger within a solenoid coil, the system comprising:
    a solenoid coil assembly comprising a solenoid winding within an electrical insulator which is within an electrically conductive coil case;
    a power source electrically connected to said electrically conductive coil case; and
    a solenoid plunger assembly comprising said solenoid plunger within an electrically conductive valve housing;
    wherein, when said solenoid plunger assembly is correctly positioned within said solenoid coil assembly, said electrically conductive coil case is in electrical communication with said electrically conductive valve housing.

2. The system of claim 1, further comprising a microcontroller for detecting current flow from said power source, through said coil case, and into said solenoid case.

3. The system of claim 1, further comprising an insulator shell arranged between said solenoid winding and said electrically conductive coil case.

4. The system of claim 1, further comprising an over mold surrounding said electrically conductive coil case.

5. The system of claim 1 wherein said coil case comprises metal.

6. The system of claim 1 wherein said solenoid case comprises metal.

7. The system of claim 1 wherein said solenoid plunger assembly further includes a valve which is opened by movement of said solenoid plunger.

8. The system of claim 7 wherein said valve is a deluge valve in a fire sprinkler system.

* * * * *